(12) United States Patent
Jia et al.

(10) Patent No.: US 10,936,499 B2
(45) Date of Patent: Mar. 2, 2021

(54) METHOD, DEVICE AND COMPUTER PROGRAMME PRODUCT FOR STORAGE MANAGEMENT

(71) Applicant: EMC IP Holding Company LLC, Hopkinton, MA (US)

(72) Inventors: Ruiyong Jia, Beijing (CN); Xinlei Xu, Beijing (CN); Lifeng Yang, Beijing (CN); Changyu Feng, Beijing (CN); Yousheng Liu, Beijing (CN); Xiaobo Zhang, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 35 days.

(21) Appl. No.: 16/360,328

(22) Filed: Mar. 21, 2019

(65) Prior Publication Data
US 2019/0332544 A1  Oct. 31, 2019

(30) Foreign Application Priority Data

Apr. 28, 2018 (CN) .......................... 201810402838.1

(51) Int. Cl.
| | |
|---|---|
| *G06F 12/00* | (2006.01) |
| *G06F 12/0891* | (2016.01) |
| *G06F 12/0806* | (2016.01) |
| *G06F 11/16* | (2006.01) |
| *G06F 12/1045* | (2016.01) |
| *G06F 11/10* | (2006.01) |

(52) U.S. Cl.
CPC ...... *G06F 12/0891* (2013.01); *G06F 11/1016* (2013.01); *G06F 11/167* (2013.01); *G06F 12/0806* (2013.01); *G06F 12/1045* (2013.01)

(58) Field of Classification Search
CPC ............ G06F 12/0891; G06F 11/1016; G06F 11/167; G06F 12/0806; G06F 12/1045
See application file for complete search history.

(56) References Cited

U.S. PATENT DOCUMENTS

| | | | | |
|---|---|---|---|---|
| 4,916,605 A | * | 4/1990 | Beardsley | G06F 11/1666 701/18 |
| 5,325,499 A | * | 6/1994 | Kummer | G06F 12/0888 365/195 |
| 5,561,795 A | * | 10/1996 | Sarkar | G06F 11/1471 |

(Continued)

*Primary Examiner* — Mano Padmanabhan
*Assistant Examiner* — Mohammad S Hasan
(74) *Attorney, Agent, or Firm* — BainwoodHuang

(57) ABSTRACT

Techniques perform storage management. Such techniques involve, in response to an operation to be performed on data in a cache page, determining a first cache page reference corresponding to the cache page, the first cache page reference comprising a pointer value indicating the cache page. Such techniques further involve creating, based on the first cache page reference and the operation, a second cache page reference corresponding to the cache page, the second cache page reference comprising the pointer value. Such techniques further involve performing the operation on the data in the cache page via the second cache page reference. One cache page can correspond to a plurality of cache page references. Additionally, copy of data from one cache page to a further cache page can be effectively avoided, so as to enhance input/output performance and utilization rate of storage space.

23 Claims, 11 Drawing Sheets

(56) References Cited

U.S. PATENT DOCUMENTS

| | | | | |
|---|---|---|---|---|
| 5,829,022 | A | * | 10/1998 | Watanabe ............. G06F 16/289 711/118 |
| 6,334,168 | B1 | * | 12/2001 | Islam .................. G06F 11/1076 711/111 |
| 9,003,129 | B1 | * | 4/2015 | Harvey ............... G06F 12/0817 711/119 |
| 9,122,589 | B1 | | 9/2015 | Bono et al. |
| 9,864,683 | B1 | | 1/2018 | Xu et al. |
| 9,916,244 | B1 | | 3/2018 | Tolvanen et al. |
| 9,934,163 | B1 | | 4/2018 | Armangau et al. |
| 2001/0013087 | A1 | * | 8/2001 | Ronstrom ............. G06F 12/122 711/133 |
| 2009/0132538 | A1 | * | 5/2009 | Kojima ............... G06F 21/6218 |
| 2010/0082547 | A1 | * | 4/2010 | Mace .................. G06F 11/1471 707/648 |
| 2011/0022801 | A1 | * | 1/2011 | Flynn ........................ G06F 9/52 711/120 |
| 2012/0137059 | A1 | * | 5/2012 | Yang ....................... G06F 3/068 711/104 |
| 2013/0232295 | A1 | * | 9/2013 | Benhase ............... G06F 12/128 711/103 |
| 2013/0339643 | A1 | * | 12/2013 | Tekade ................. G06F 16/275 711/162 |
| 2015/0212751 | A1 | * | 7/2015 | Shi .......................... G06F 21/79 711/103 |
| 2017/0024326 | A1 | * | 1/2017 | Luo ....................... G06F 12/123 |
| 2018/0232144 | A1 | * | 8/2018 | Pahwa .................. G06F 3/0679 |
| 2019/0220402 | A1 | * | 7/2019 | Xu ....................... G06F 12/0802 |

* cited by examiner

METHOD, DEVICE AND COMPUTER PROGRAMME PRODUCT FOR STORAGE MANAGEMENT

CROSS-REFERENCE TO RELATED APPLICATION(S)

This application claims priority to Chinese Patent Application No. CN201810402838.1, on file at the China National Intellectual Property Administration (CNIPA), having a filing date of Apr. 28, 2018, and having "METHOD, DEVICE AND COMPUTER PROGRAMME PRODUCT FOR STORAGE MANAGEMENT" as a title, the contents and teachings of which are herein incorporated by reference in their entirety.

FIELD

Embodiments of the present disclosure generally relate to the field of storage management, and more specifically, to a method, a device and a computer program product for operations between cache pages and cache page references.

BACKGROUND

A dual active storage processor (SP) architecture can be applied in the storage technologies. Multi-core cache (MCC) is a core caching component of dynamic random access memory which leverages write cache mirroring techniques to ensure data availability when a single SP fails. Usually, both cache pages and their corresponding cache page references are provided. As such, it is required that data in the cache pages is managed by the cache page references, thus requiring relatively high input/output overhead.

SUMMARY

In general, embodiments of the present disclosure provide a method, a device and a computer program product for storage management.

According to a first aspect of the present disclosure, there is provided a method for storage management. The method includes: in response to an operation to be performed on data in a cache page, determining a first cache page reference corresponding to the cache page, the first cache page reference including a pointer value indicating the cache page; creating, based on the first cache page reference and the operation, a second cache page reference corresponding to the cache page, the second cache page reference including the pointer value; and performing the operation on the data in the cache page via the second cache page reference.

According to a second aspect of the present disclosure, there is provided a device for storage management. The device includes at least one processing unit; and at least one memory coupled to the at least one processing unit and stored with machine-executable instructions. The instructions, when executed by the at least one processing unit, cause the device to perform actions consisting of: in response to an operation to be performed on data in a cache page, determining a first cache page reference corresponding to the cache page, the first cache page reference including a pointer value indicating the cache page; creating, based on the first cache page reference and the operation, a second cache page reference corresponding to the cache page, the second cache page reference including the pointer value; and performing the operation on the data in the cache page via the second cache page reference.

According to a third aspect of the present disclosure, there is provided a computer program. The computer program product is tangibly stored on a non-transient computer-readable medium and includes machine-executable instructions, the machine-executable instructions, when executed, causing a machine to perform steps of the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the more detailed description of the example embodiments of the present disclosure with reference to the accompanying drawings, wherein the same reference sign generally refers to the like element in the example embodiments of the present disclosure.

DETAILED DESCRIPTION OF EMBODIMENTS

Figure 1:
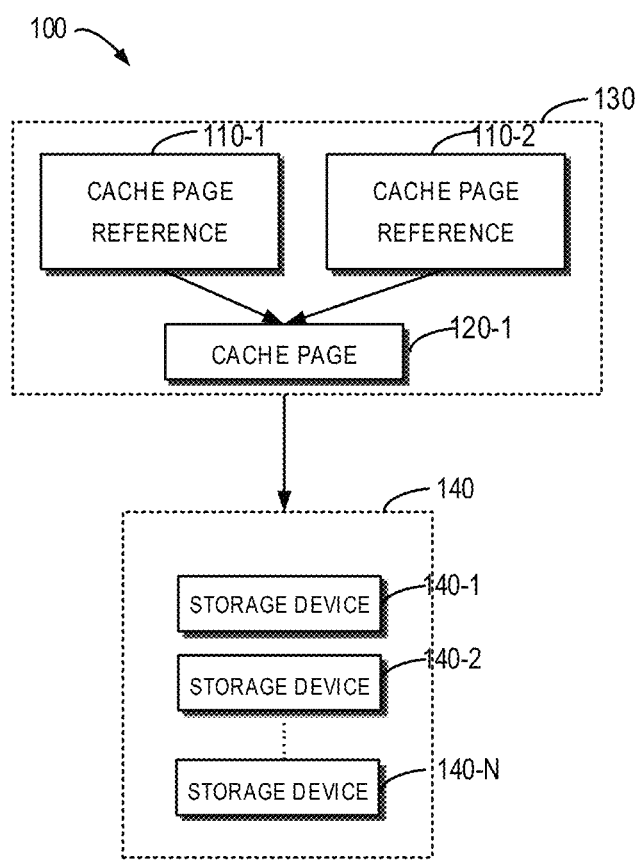
FIG. 1 illustrates a schematic block diagram of an implementation environment of embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments of the present disclosure will be described in more details with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text also can include other explicit and implicit definitions.

The term "Cache Page" used herein describes a physical memory chunk of fixed size (e.g., 8 KB) containing data to be read or written. The cache page has a page number and a pair of pages with the same page number in two storage processors (SPs) is called mirrored pages. SP maintains a mapping between a cache physical memory/a cache page and exchanges its local mapping with a peer SP during startup, such that the pair of pages can be mirrored to each other between two SPs under a software control; by using hardware direct memory access (DMA) engines etc.

The term "Cache Page Reference" used herein can refer to a data structure and can track and control all of the data on the cache pages. The cache page reference associates cache pages with particular data on a disk. One reference consists of at most 8 cache pages.

Usually, if a storage device processor receives a write command of data and the write command indicates a position to which the data is written (e.g., logical block address (LBA) 0*1000 on a first storage device), the storage device processor can firstly look up a cache page reference corresponding to the position in a hash table. If the corresponding cache page reference is not found in the hash table, a computing device will create a cache page reference including the position to which the data is written. The storage device processor also allocates a corresponding cache page for the cache page reference, and the cache page is in one-to-one correspondence with the cache page reference. Whenever a read/write operation is executed, one Input/Output (IO) request needs to be performed. However, if the storage device processor executes a large number of small read/write operations, multiple IO requests need to be performed and these requests are serial. Therefore, the IO performance needs to be improved.

FIG. 1 illustrates a schematic block diagram of an implementation environment 100 of embodiments of the present disclosure. As shown in FIG. 1, a storage device processor 130 is provided with cache page references 110-1, 110-2 and a cache page 120-1 thereon. It can be understood that the number of cache page references and cache pages shown in FIG. 1 is merely by way of example, and not limiting. The environment 100 also includes storage devices 140-1, 140-2, . . . , 140-N (collectively known as "storage device 140," where N is any positive integer).

According to some embodiments of the present disclosure, a plurality of cache page references (e.g., cache page reference 110-1 ("a first cache page reference") and the cache page reference 110-2 ("a second cache page reference")) can simultaneously correspond to the cache page 120-1, so as to reduce, for example, IO overheads generated by performing a large number of write/read operations and improve IO performance.

Figure 2A:
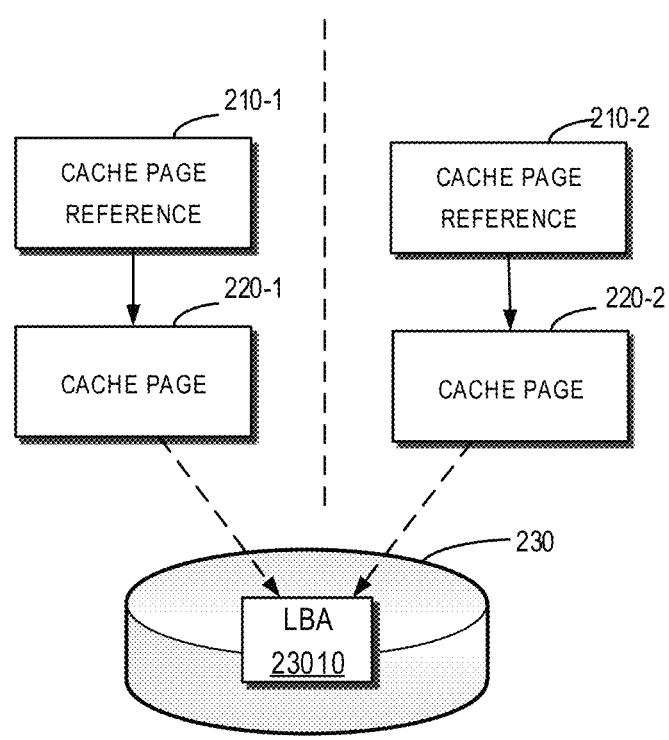
FIGS. 2A-2C illustrate schematic block diagrams of cache pages and cache page references.
Figure 2B:
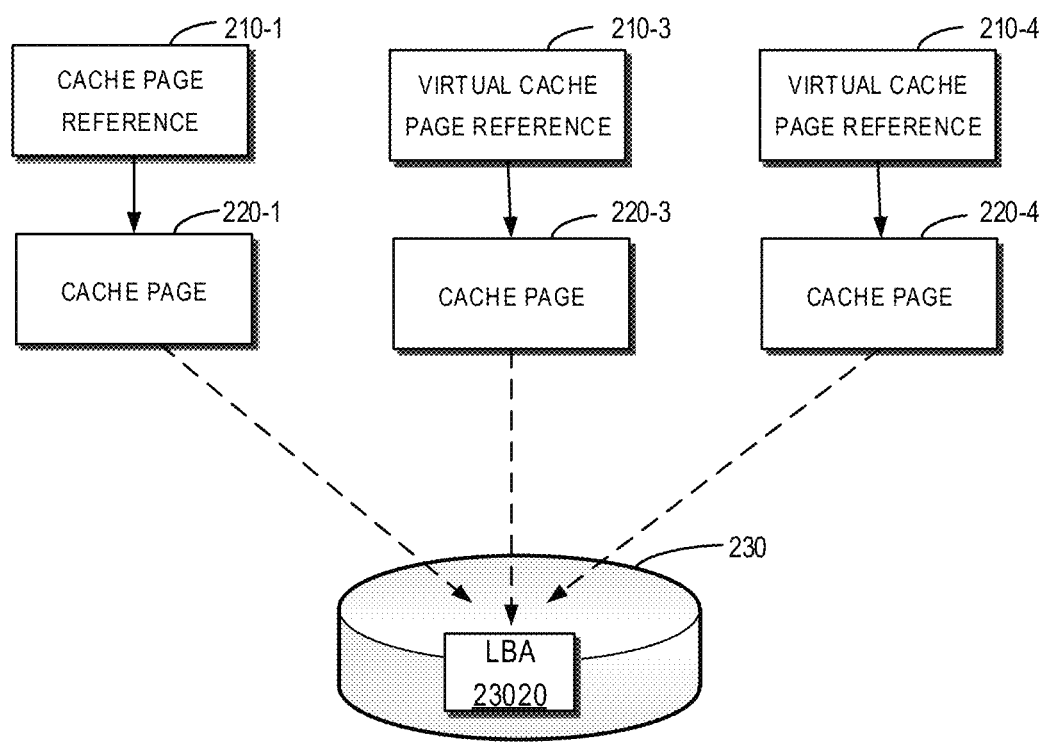
Figure 2C:
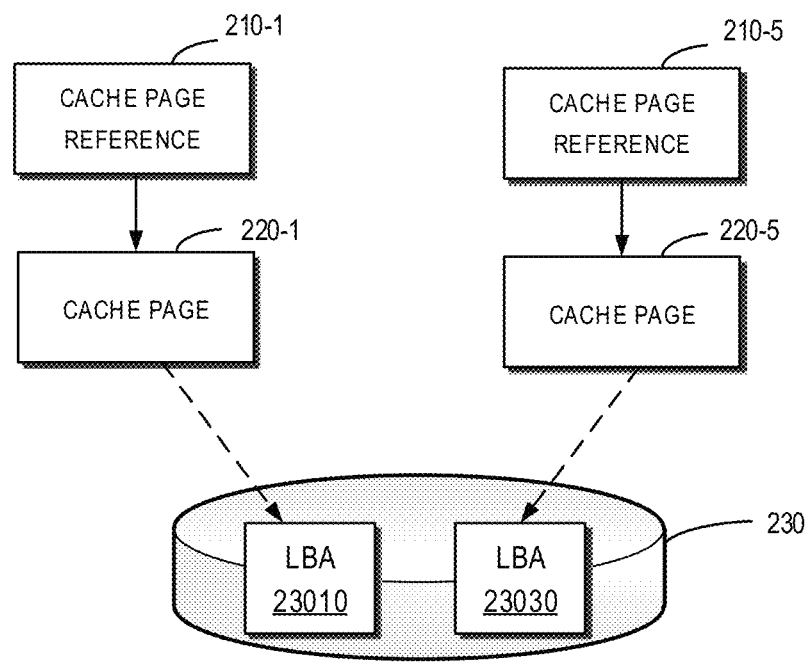

As described above, the cache page reference is in one-to-one correspondence with the cache page in conventional technologies. FIGS. 2A to 2C illustrate the cache page reference and the cache page in the conventional technologies.

As shown in FIG. 2A, the cache page 220-1 corresponds to the cache page reference 210-1 and both of them are positioned on the first SP. The cache page 220-2 corresponds to the cache page reference and both of them are positioned on the second SP. The cache page 220-1 and the cache page 220-2 are mirrored cache pages, thus they are associated with the same storage position 23010 on the storage device 230.

The cache page reference 210-1 can include one or more of an index of the storage device 230, a start LBA of the storage position 23010, a state of data on the cache page 220-1 and access right information etc. Since the cache page 220-1 and the cache page 220-2 are mirrored, the index of the storage device 230 and the start LBA of the storage position 23010 in the cache page reference 210-2 is identical to those in the cache page reference 210-1.

FIG. 2B illustrates a virtual cache page reference technology. As shown in FIG. 2, the cache page 220-1 can be accessed and controlled by the cache page reference 210-1. By introducing the virtual cache page technology, the system performance can be improved when a large number of read/write operations need to be performed on the cache page 220-1. FIG. 2B illustrates virtual cache page references 210-3 and 210-4. For example, if a plurality of read/write operations is performed and the cache page reference 210-1 has been occupied, the virtual cache page references 210-3 and 210-4 can be created and cache pages 220-3 and 220-4 are respectively allocated to the virtual cache page references 210-3 and 210-4. The virtual cache page references 210-3 and 210-4 have a same index of the storage device 230 and a same start LBA of the storage position 23020 as the cache page reference 210-1. Since the index is virtual, the virtual cache page references 210-3 and 210-4 do not have access rights to the cache page 220-1. Data on the cache page 220-1 is copied to the cache pages 220-3 and 220-4 to facilitate parallel reading. However, the data being copied to the cache pages 220-3 and 220-4 will occupy storage resources.

FIG. 2C illustrates a data movement technology. As shown in FIG. 2C, data stored at the position 23010 will be moved to a position 23030. The cache page 220-1 is associated with the position 23010 and the cache page 220-1 is associated with the position 23030. The data to be transferred is copied from the cache page 220-1 to the cache page 220-5, so as to realize a transfer from the position 23010 to the position 23030. However, the data being copied to the cache page 220-5 will also occupy storage resources.

In order to at least partially solve the above problem, embodiments of the present disclosure provide a technical solution in which a cache page corresponds to a plurality of cache page references. Embodiments of the present disclosure will be described below with reference to FIGS. 3 to 7.

Figure 3:
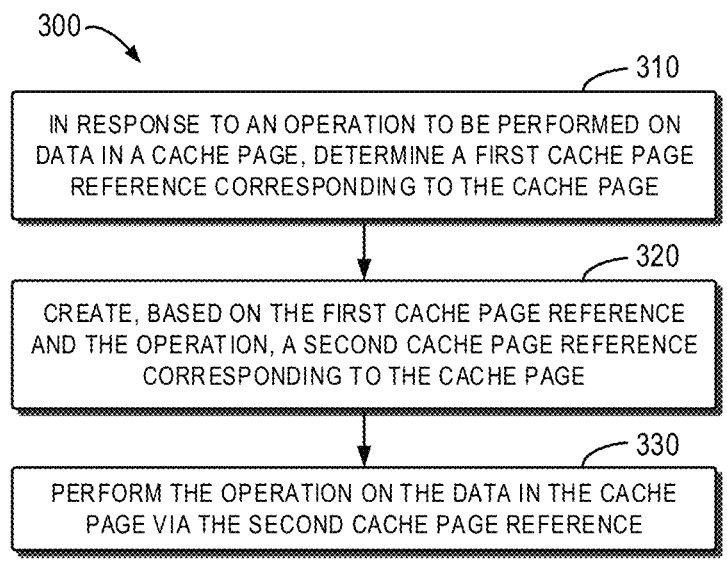
FIG. 3 illustrates a flowchart of a method according to some embodiments of the present disclosure.
Figure 4:
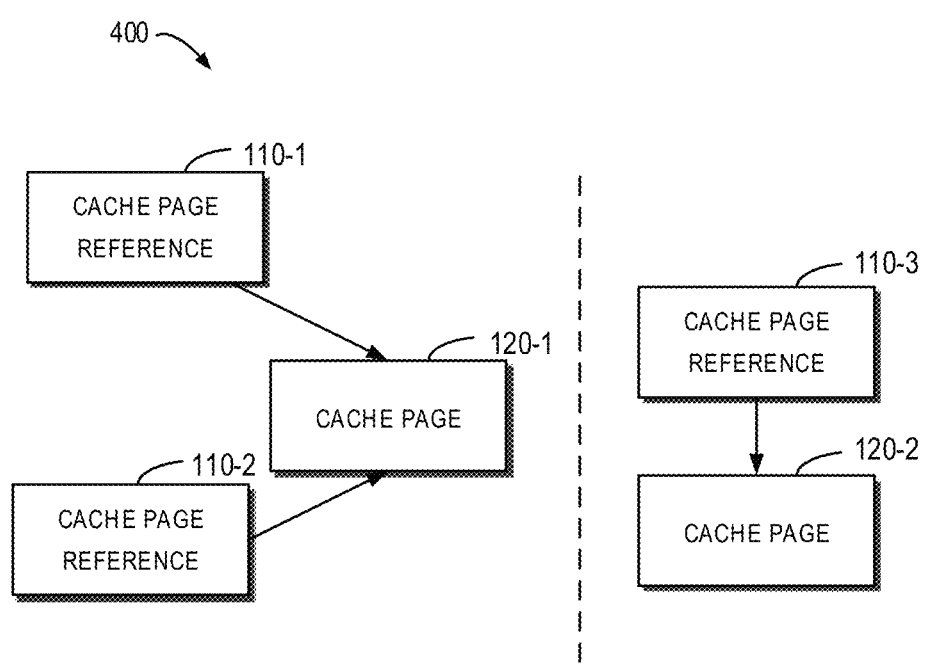
FIG. 4 illustrates a schematic block diagram of cache page and cache page reference according to some embodiments of the present disclosure.

FIG. 3 illustrates a flowchart of a method 300 according to some embodiments of the present disclosure. It can be understood that the method 300 can be implemented at the storage device processor 130 shown in FIG. 1. FIG. 4 illustrates a schematic block diagram of cache pages and cache page references according to some embodiments of the present disclosure. It can be understood that the number of cache page references and cache pages shown in FIG. 4 is merely by way of example and not limiting. The method 300 will be explained below with reference to FIG. 4.

At block 310, if an operation will be performed on data in the cache page 120-1, a storage device processor 310 determines the cache page reference 110-1 corresponding to the cache page 120-1, the cache page reference 110-1 including a pointer value pointing to the cache page 120-1. In some embodiments, the cache page reference 110-1 can include an index of a storage device (e.g., the storage device 140-1) associated with the cache page 120-1. The cache page reference 110-1 can also include a storage position corresponding to the cache page on the storage device. Alternatively or additionally, the cache page reference 110-1 can also include its right information for accessing the cache page 120-1. In some other embodiments, the cache page reference 110-1 can also include state information of the data on the cache page 120-1.

As described above, the cache page reference is a data structure. Thus, the cache page reference 110-1 can store information in any appropriate structure. Table 1 below illustrates an example storage structure of the cache page reference 110-1.

TABLE 1

| Storage device index | 1 |
|---|---|
| Start LBA | 0*1000 |
| Data state | DDDD DDDD |
| Token number | 1 |

"Storage device index 1" indicates that the current cache page 120-1 is associated with the storage device 140-1. "Start LBA 0*1000" represents that the data on the cache page 120-1 has a start storage address 0*1000 on the storage device 140-1. Since one cache page reference usually denotes 64 KB continuous data on the storage device, the cache page reference only records the start LBA.

The cache page reference can point to 8 cache pages with size of 8 KB, and the cache page reference is provided thereon with data states of this 8 sectors. For example, state "I (Invalid)" represents that data of this sector is unavailable; state "V (Valid)" indicates that the data of this sector has already been flushed to the storage device; and state "D (Dirty)" denotes that data of this sector is different from the data on the corresponding storage device, i.e., data of this sector has not been flushed to the storage device yet. When the operation is a read operation, state "P" means that this sector has no data. When the operation is a write operation, state "P" indicates that the data of this sector needs to be confirmed. It can be understood that the above state representations are merely by way of example and not limiting.

In an example embodiment, the token number can represent access rights of the cache page reference to the cache page. For example, if the token number is zero, it means that the cache page reference cannot access the cache page. If the token number is 1, it means that the cache page reference can access the cache page. If the token number is 2, it means that the cache page reference can modify the cache page, and the mirrored cache page reference (e.g., cache page reference 110-3) of the cache page reference cannot access the mirrored cache page of the cache page.

At block 320, the storage device manager 130 create, based on the operations and the cache page reference 110-1, the cache page reference 110-2 corresponding to the cache page 120-1. In some embodiments, an operation on the data can be moving the data from a first position to a second position. In this example, the cache page reference 110-2 includes position information of the second position. For example, the cache page reference 110-2 can include an index of a storage device corresponding to the second position and a start LBA corresponding to the second position on the second storage device. The cache page reference 110-2 can be located in the same storage device processor together with the cache page reference 110-1, and also can be located in a different storage device processor. Alternatively or additionally, the cache page reference 110-2 also includes its access right information to the cache page. In some other embodiments, the cache page reference 110-2 also includes state information. The cache page reference 110-2 includes a same pointer value as the cache page reference 110-1, thus realizing a plurality of cache page references corresponding to the same cache page.

Figure 7:
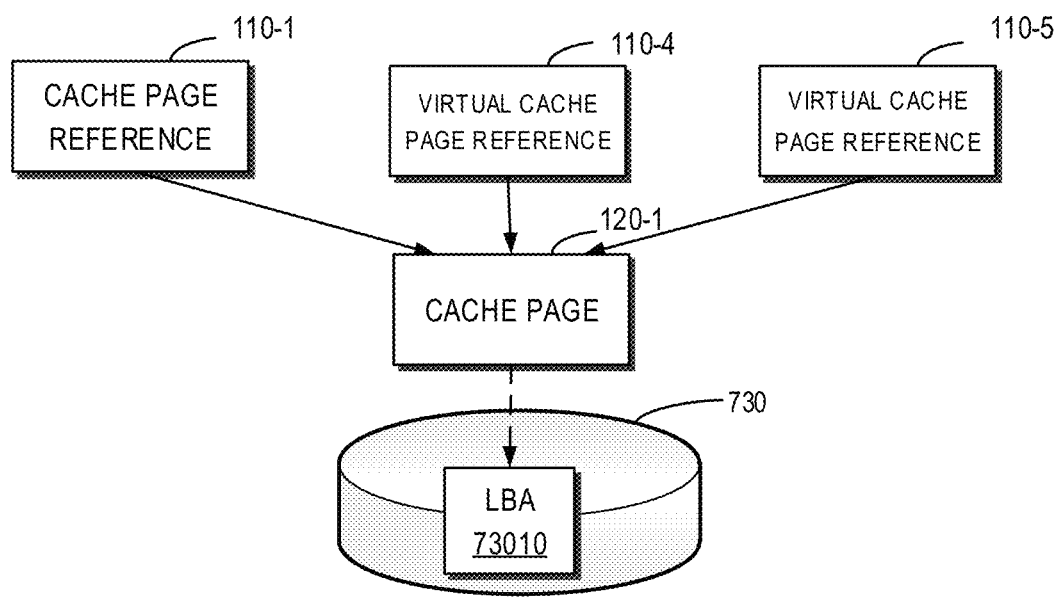
FIG. 7 illustrates a schematic block diagram of cache page and cache page reference according to some embodiments of the present disclosure.

As shown in FIG. 7, in some embodiments, operations on data can be a large number of read operations. The cache page reference 110-1 is occupied by a read operation and the storage device manager 130 can create the virtual cache page references 110-4 and 110-5. Both of the created virtual cache page references 110-4 and 110-5 have pointer values pointing to the cache page 120-1. In the embodiments, because the operation to be performed is reading data at the position 73010 of the storage device 730, the cache page reference 110-1 and the created virtual cache page references 110-4 and 110-5 have the same storage device index and the same start LBA on the storage device.

At block 330, the storage device processor 130 can perform the operations on the data in the cache page 120-1 via the cache page reference 110-2 and/or 110-3. For example, as described above, if the operation is a data movement operation, to achieve a data movement, because the cache page reference 110-1 (source) and the cache page reference 110-2 (target) have already pointed to the same cache page, only the state of data of the cache page reference 110-2 needs to be updated. In this way, it is unnecessary to copy the data on the cache page 120-1 to another cache page, therefore the occupancy of storage space and overheads of system IO is reduced, thereby improving the performance of system IO.

As described above, in some embodiments, the operations are a large number of read operations. The cache page reference 110-1 can be occupied by one of the read operations. The cache page reference 110-1 and the created virtual cache page references 110-4 and 110-5 have the same storage device index and the same start LBA on the storage device. Since the cache page reference 110-1 and the created virtual cache page references 110-4 and 110-5 all point to the cache page 120-1, therefore an allocation of new cache pages to the created virtual cache page references and copying of data between the cache pages are avoided.

Similarly, in some embodiments, the operations are a large number of write operations. The cache page reference 110-1 can be occupied by one of the write operations. The cache page reference 110-1 and the created virtual cache page references 110-4 and 110-5 have the same storage device index and the same start LBA on the storage device. The cache page reference 110-1 and the created virtual cache page references 110-4 and 110-5 may have different data states. For example, the data state of the cache page reference 110-1 can be "PPPP 1111," and the data states of the created virtual cache page references 110-4 and 110-5 are "1111 PPII" and "1111 IIPP" respectively. Parallel writings can be performed due to different data states, thereby avoiding an allocation of new cache pages to the created virtual cache page references and copying of data between the cache pages.

Figure 5:
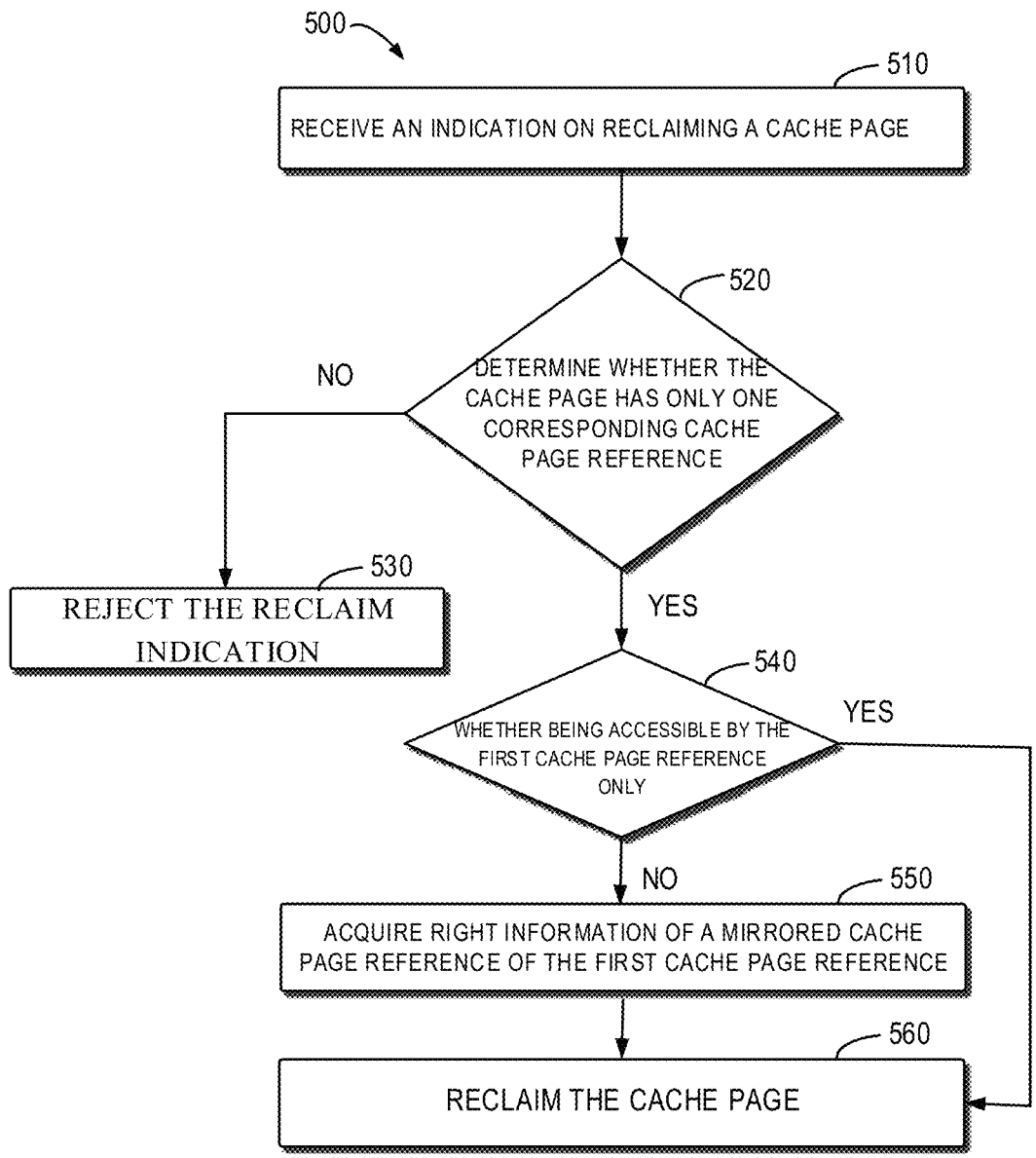
FIG. 5 illustrates a flowchart of a method according to some embodiments of the present disclosure.

In some embodiments, the method 300 also includes reclaiming the cache page 120-1. FIG. 5 illustrates a flowchart of a method 500 of reclaiming a cache page according to some embodiments of the present disclosure. It can be understood that the method shown in FIG. 5 is merely by way of example and not limiting.

At block 510, the storage device processor 130 receives an indication on reclaiming the cache page 120-1. In some embodiments, the storage device processor 130 determines whether the cache page 120-1 can be reclaimed from the cache page reference 110-1. For example, the storage device processor 130 determines that there is no "dirty" cache page in the cache page reference 110-1 (that is, data has not been flushed to a corresponding storage device yet).

At block 520, the storage device processor 130 determines a number of cache page references corresponding to the cache page 120-1. For example, the cache page 120-1 can include a statistic of its corresponding cache page references. If the storage device processor 130 determines that the cache page 120-1 corresponds to a plurality of caches, the storage device processor 130 rejects to reclaim the cache page 120-1 at block 530.

If the storage device processor 130 determines that the cache page 120-1 only corresponds to the cache page reference 110-1, at block 540, the storage device processor 130 determines whether the cache page 120-1 is accessible only by the cache page reference 110-1. According to some embodiments of the present disclosure, the cache page 120-1 can be shared by the storage device processor 130 and a cache page reference on another storage device processor. Therefore, "page token" is provided according to some embodiments of the present disclosure which represents information about access rights of the cache page is shared or exclusive. If the cache page has two page tokens, it means that the cache page has an exclusive access rights. If the cache page has one page token, it means that the cache page has shared access rights. If the cache page has no page token, it means that the cache page cannot be accessed by the cache page reference on the storage device processor.

In some embodiments, a page token can be created via the following procedure. During a startup of a storage array, a storage device processor which starts up first will own all mirrored cache pages. When a peer storage device processor starts up later, it has no mirrored cache pages and needs to request the cache pages from the first storage device processor. For this pair of mirrored cache pages, each cache page has one page token by default. If a pair of mirrored cache pages is owned by the storage device processor, e.g., in its free cache page list, the cache page on the storage device processor will have two page tokens, and the mirrored cache page on the peer storage device processor has no page token.

While sending a free cache page to the peer storage device processor for the purpose of cache page balance, the storage device processor should send two tokens of the cache page together with the cache page to the peer storage device processor. When the cache page transfers an access right (reference token) of the cache page reference to the peer storage device processor and it has two cache page tokens of the cache page, it should also transfer one page token of each cache page to the peer storage device processor, such that the mirrored cache page reference can access the pages.

When the storage device processor fails, the peer storage device processor should correspondingly recover cache pages. All the cache pages owned by the peer storage device processor will be taken over and be put in a list of local free cache page with each cache page having two tokens. For those cache pages with only one token locally, the number of page token is directly set to 2 because the peer cache page is dead.

If the storage device processor 130 determines that the cache page 120-1 is accessible only by the cache page reference 110-1, at block 560, the storage device processor 130 reclaims the cache page 120-1. For example, if the storage processor 130 determines that the cache page 120-1 has two page tokens, the cache page will be reclaimed.

If the storage device processor 130 determines that the cache page 120-1 is accessible by the cache page reference 110-1 and its mirrored cache page reference 110-2, the storage device processor 130 acquires the access rights of the cache page reference 110-1 and its mirrored cache page reference to reclaim the cache page.

For example, in some embodiments, the storage device processor 130 can acquire from its mirrored storage device processor 130 a page token of the mirrored cache page. In some other embodiments, the storage device processor 130 can send the page token of the cache page 120-1 to the mirrored storage device processor. It can be determined from the following equation (1):

$$\text{Home SP (Cache Page } N) = N \text{ MOD number of SPs} \quad (1),$$

N represents an index of a cache page and Cache Page indicates a cache page. If it is determined from the equation (1) that the storage device processor 130 is a local SP, the storage device processor 130 requests the page token of the mirrored cache page of the cache page 120-1 from the peer (mirrored) storage device processor. If the storage device processor 130 is a non-local SP, it will request to send the page token of the cache page 120-1 to the peer storage device processor.

At block 560, the storage device processor 130 reclaims the cache page 120-1.

Figure 6:
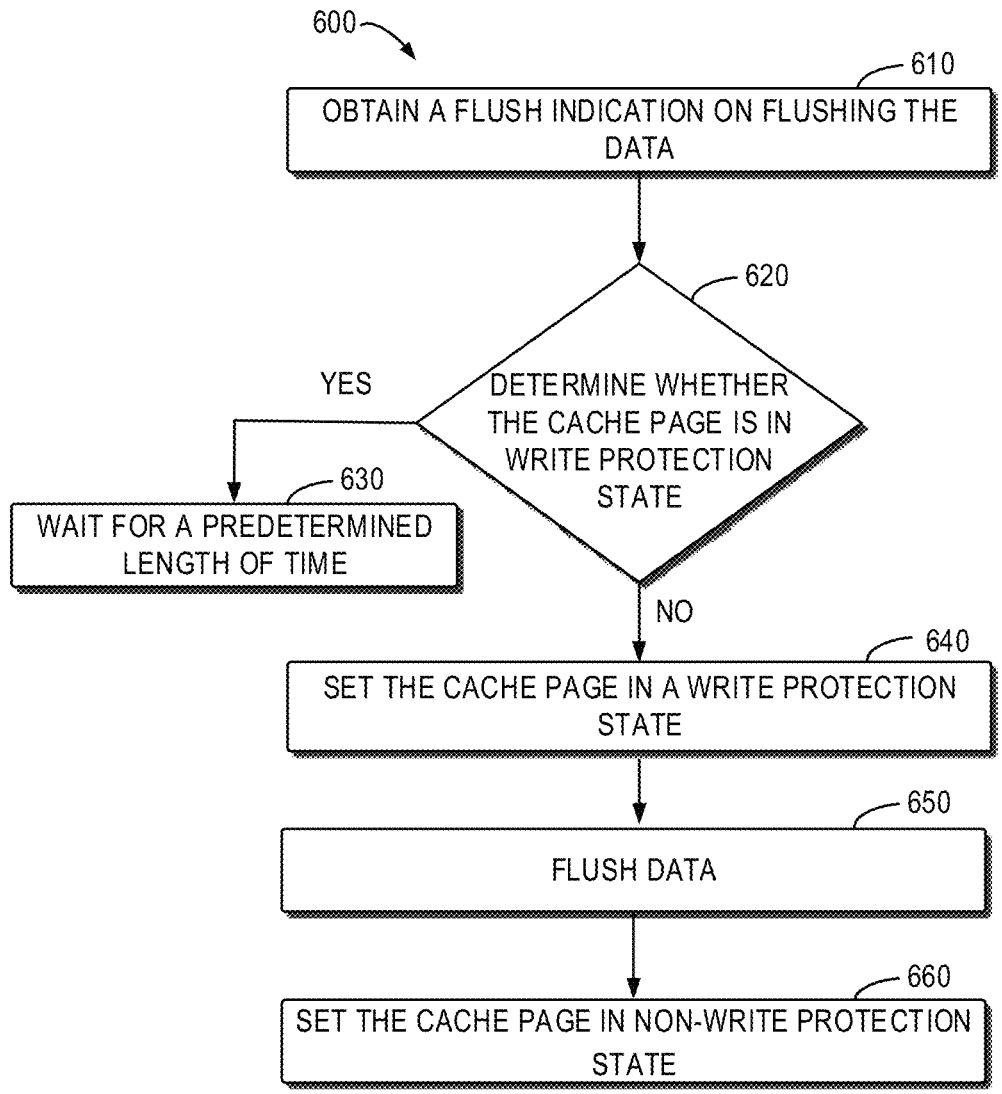
FIG. 6 illustrates a flowchart of a method according to some embodiments of the present disclosure.

In some embodiments, the method 300 also includes flushing the data on the cache page 120-1. FIG. 6 illustrates a flowchart of a method 600 of reclaiming cache pages according to some embodiments of the present disclosure. It can be understood that the method shown in FIG. 6 is merely by way of example and not limiting.

At block 600, the storage device processor 130 obtains a flush indication on flushing the data on the cache page 120-1. At block 620, the storage device processor 130 determines whether the cache page 120-1 is in a write protection state. In some embodiments, it is indicated whether the cache page 120-1 is in a write protection state by adding a write protection locking field in the header of the cache page 120-1.

If the cache page 120-1 is in the write protection state, the storage device processor 130 does not flush the data at block 130, and waits for a predetermined length of time, and then re-determines whether the cache page 120-1 is in the write protection state.

If the cache page 120-1 is in a non-write protection state, at block 640, the storage device processor 130 sets the cache page 120-1 to the write protection state. For example, the storage device processor 130 can change the write protection state information by changing the header of the cache page 120-1. At block 650, the storage device processor 130 flushes the data into the storage device corresponding to the cache page 120-1. At block 660, the storage device processor 130 sets the cache page 120-1 to the non-write protection state.

In some embodiments, the method 300 also includes reclaiming the cache page reference. The storage device processor 130 can create a list of cache page references with shared cache pages. While reclaiming the cache page references, the storage device processor 130 can avoid invalid reclaim of the cache page reference by looking up the list.

According to embodiments of the present disclosure, a plurality of cache page references is allowed to share a same cache page, which help improve the performance of system IO by eliminating copy of the cache page and avoiding duplications of cache pages in a plurality of key IO paths (e.g., small parallel reads and writes, data movement within and between LUNs and PFDC datalog flush).

In another embodiment, the storage device processor 130 also can acquire a request of modifying the data on the cache page 120-1. If the storage device processor 130 determines that the cache page 120-1 only corresponds to the cache page reference 110-1 and the cache page reference 110-1 has exclusive access rights, the storage device processor 130 can generate an indication that the data on the cache page 120-1 can be modified.

In some embodiments, if the storage device processor 130 determines that the cache page 120-1 only corresponds to the cache page reference 110-1 and the cache page reference 110-1 has shared access rights, the storage device processor 130 can request access rights information of the mirrored cache page reference of the cache page reference 110-1 for modification. If the storage device processor 130 acquires access rights information of the mirrored cache page reference, an indication that the data on the cache page 120-1 can be modified is generated. If the storage device processor 130 fails to acquire access rights information of the mirrored cache page reference, an indication that the data on the cache page 120-1 cannot be modified is generated.

Figure 8:
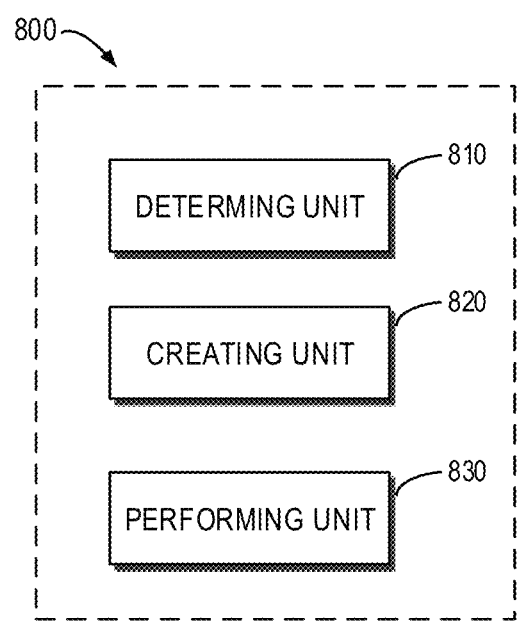
FIG. 8 illustrates a schematic block diagram of an apparatus suitable for implementing embodiments of the present disclosure.

FIG. 8 illustrates a schematic block diagram of an apparatus 800 for data processing according to some embodiments of the present disclosure. The apparatus 800, for example, can be implemented in the system 100 shown by FIG. 1, or directly serves as the system 100. As shown in FIG. 8, the apparatus 800 includes a determining unit 810, a creating unit 820 and a performing unit 830.

The determining unit 810 is configured to in response to an operation to be performed on data in a cache page, determine a first cache page reference corresponding to the cache page, the first cache page reference including a pointer value indicating the cache page. In some embodiments, the determining unit 810 is also configured to determine at least one item of the first cache page reference: an index of a storage device associated with the cache page, a position corresponding to the cache page on the storage device, right information of the first cache page reference for accessing the cache page, and state information of the data.

The creating unit 820 is configured to create, based on the first cache page reference and the operation, a second cache page reference corresponding to the cache page, the second cache page reference including the pointer value. In some embodiments, the creating unit 820 is also configured to in response that the operation to store the data to a second position, create at least one item of the second cache page reference: an index of a storage device indicated by the second position, a position on the storage device indicated by the second position, right information of the second cache page reference for accessing the cache page, and state information of the data.

The performing unit 830 is configured to perform the operation on the data in the cache page via the second cache page reference.

In some embodiments, the apparatus 800 also includes a reclaiming unit (not shown). In some embodiments, the reclaiming unit is configured to: in response to a reclaim indication on reclaiming the cache page, determine a number of cache page references corresponding to the cache page; and in response to the number being equal to a first threshold number, determine right information for accessing the cache page; and reclaim, based on the right information for accessing the cache page, the cache page.

In some embodiments, the reclaiming unit is configured to: determine right information of a mirrored cache page reference of the first cache page reference for accessing the cache page; in response to determining the cache page being accessible by the first cache page reference only, reclaim the cache page.

In some embodiments, the reclaiming unit is configured to: in response to determining that the cache page is accessible by both the first cache page reference and the second cache page reference, reclaim the cache page based on the right information of the first cache page reference for accessing the cache page and the right information of the mirrored cache page reference of the first cache page reference for accessing the cache page.

In some embodiments, the apparatus 800 also includes a flushing unit (not shown). In some embodiments, the flushing unit is configured to: in response to obtaining a flush indication on flushing data, determine information of write protection of the cache page; and flush the data based on the information of write protection.

In some embodiments, the flushing unit is also configured to: in response the information of write protection indicating that the cache page is in a non-write protection state, set the cache page in the write protection state; flush the data; and set the cache page in the non-write protection state.

The units included in the apparatus 800 can be implemented by various manners, including software, hardware, firmware or any combinations thereof. In one embodiment, one or more units can be implemented by software and/or firmware, such as machine executable instructions stored on the storage media. Apart from the machine executable instructions or as an alternative, part or all of the units in the apparatus 800 can be at least partially implemented by one or more hardware logic components. As an example instead of a limitation, available example types of hardware logic components include a field programmable gate array (FPGA), an application-specific integrated circuit (ASIC), an application-specific standard product (ASSP), a system-on-chip (SOP), a complex programmable logic device (CPLD) and the like.

Figure 9:
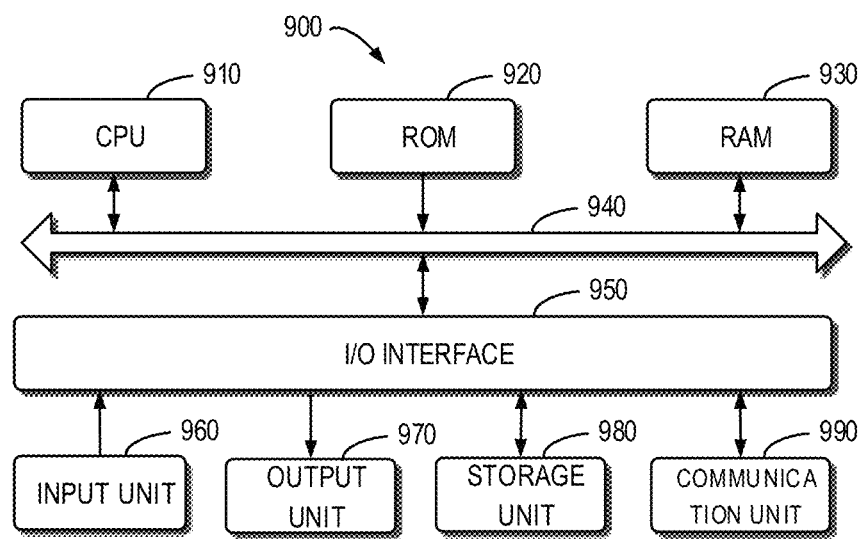
FIG. 9 illustrates a schematic block diagram of a device suitable for implementing embodiments of the present disclosure.

FIG. 9 illustrates a schematic block diagram of an electronic device 900 for implementing embodiments of the present disclosure. As shown, the device 900 includes a central process unit (CPU) 910, which can execute various suitable actions and processing based on computer program instructions stored in a read-only memory (ROM) 920 or computer program instructions loaded in a random-access memory (RAM) 930 from a storage unit 980. The RAM 930 can also store all kinds of programs and data required by the operations of the device 900. The CPU 910, ROM 920 and RAM 930 are connected to each other via a bus 940. An input/output (I/O) interface 950 is also connected to the bus 940.

A plurality of components in the device 900 is connected to the I/O interface 950, including: an input unit 960, such as keyboard, mouse and the like; an output unit 970, such as various kinds of display and loudspeakers etc.; a storage unit 980, such as a disk and an optical disk etc.; and a communication unit 990, such as a network card, a modem, a wireless transceiver and the like. The communication unit 990 allows the device 900 to exchange information/data with other devices via the computer network, such as Internet, and/or various telecommunication networks.

Each of the above described procedures and processing, such as procedures 300, 400 and 500, can also be executed by a processing unit 910. For example, in some embodiments, the procedures 300, 400 and 500 can be implemented as a computer software program tangibly included in a machine-readable medium, such as the storage unit 980. In some embodiments, the computer program can be partially or fully loaded and/or mounted to the device 900 via the ROM 920 and/or the communication unit 990. When the computer program is loaded to RANI 930 and executed by the CPU 910, one or more steps of the above described procedures 300, 400 and 500 can be implemented. Alternatively, in some embodiments, the CPU 910 also can be configured in any other suitable manners to perform the above procedures.

It can be seen from the above description that the solution of the present disclosure is suitable for a following application: the application dynamically groups virtual machines based on identity information of a target process in a virtual machine management system. Embodiments of the present disclosure determines, by acquiring identity information of the target process, a virtual machine running with the target process from a plurality of virtual machines based on the identity information of the target process; and assigns the determined virtual machine to a virtual machine group, thereby improving efficiency of configuration and management of virtual machines.

The present disclosure can be a method, an apparatus, a system and/or a computer program product. The computer program product can include a computer-readable storage medium, on which computer-readable program instructions for executing various aspects of the present disclosure are loaded.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means (e.g., circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for storage management, comprising:
   in response to an operation to be performed on data in a cache page, determining a first cache page reference corresponding to the cache page, the first cache page reference comprising a pointer value indicating the cache page;
   creating, based on the first cache page reference and the operation, a second cache page reference corresponding to the cache page, the second cache page reference comprising the pointer value; and
   performing the operation on the data in the cache page via the second cache page reference.

2. The method of claim 1, wherein determining the first cache page reference corresponding to the cache page comprises:
   determining at least one item of the first cache page reference:
      an index of a storage device associated with the cache page,
      a position on the storage device corresponding to the cache page,
      right information of the first cache page reference for accessing the cache page, and
      state information of the data.

3. The method of claim 1, further comprising:
   in response to a reclaim indication on reclaiming the cache page, determining a number of cache page references corresponding to the cache page; and
   in response to the number exceeding a first threshold number, rejecting the reclaim indication, the first threshold number being a finite positive integer.

4. The method of claim 1, further comprising:
   in response to a reclaim indication on reclaiming the cache page, determining a number of cache page references corresponding to the cache page; and
   in response to the number being equal to a first threshold number, determining right information for accessing the cache page, the first threshold number being a finite positive integer; and
   reclaiming the cache page based on the right information for accessing the cache page.

5. The method of claim 4, wherein reclaiming the cache page comprises:
   determining right information of a mirrored cache page reference of the first cache page reference for accessing the cache page;
   in response to determining the cache page being only accessible by the first cache page reference, reclaiming the cache page.

6. The method of claim 4, wherein reclaiming the cache page comprises:
   in response to determining that the cache page is accessible by the first cache page reference and the second cache page reference, reclaiming the cache page based on the right information of the first cache page reference for accessing the cache page and the right information of a mirrored cache page reference of the first cache page reference for accessing the cache page.

7. The method of claim 1, wherein creating the second cache page reference corresponding to the cache page comprises:
   in response that the operation is to store the data to a second position, creating at least one item of the second cache page reference:
      an index of a storage device indicated by the second position,
      a position on the storage device indicated by the second position,
      right information of the second cache page reference for accessing the cache page, and
      state information of the data.

8. The method of claim 1, further comprising:
   in response to obtaining a flush indication on flushing the data, determining information of write protection of the cache page; and
   flushing the data based on the information of write protection.

9. The method of claim 8, wherein flushing the data comprises:
   in response to the information of write protection indicating that the cache page is in a non-write protection state, setting the cache page in a write protection state;
   flushing the data; and
   setting the cache page in a non-write protection state.

10. The method of claim 1, further comprising:
    in response to a request to modifying data on the cache page, generating a reply to the request based on a number of cache page references corresponding to the cache page and information indicating access right to the cache page comprised in the cache page, the reply indicating whether the data on the cache page is allowed to be modified.

11. A device for storage management, comprising:
at least one processing unit; and
at least one memory coupled to the at least one processing unit and stored with machine-executable instructions, the instructions, when executed by the at least one processing unit, causing the device to perform actions consisting of:
in response to an operation to be performed on data in a cache page, determining a first cache page reference corresponding to the cache page, the first cache page reference comprising a pointer value indicating the cache page;
creating, based on the first cache page reference and the operation, a second cache page reference corresponding to the cache page, the second cache page reference comprising the pointer value; and
performing the operation on the data in the cache page via the second cache page reference.

12. The device of claim 11, wherein determining the first cache page reference corresponding to the cache page comprises:
determining at least one item of the first cache page reference:
an index of a storage device associated with the cache page,
a position on the storage device corresponding to the cache page,
right information of the first cache page reference for accessing the cache page, and
state information of the data.

13. The device of claim 11, wherein the actions further comprise:
in response to a reclaim indication on reclaiming the cache page, determining a number of cache page references corresponding to the cache page; and
in response to the number exceeding a first threshold number, rejecting the reclaim indication, the first threshold number being a finite positive integer.

14. The device of claim 11, wherein the actions further comprise:
in response to a reclaim indication on reclaiming the cache page, determining a number of cache page references corresponding to the cache page; and
in response to the number being equal to a first threshold number, determining right information for accessing the cache page, the first threshold number being a finite positive integer; and
reclaiming the cache page based on the right information for accessing the cache page.

15. The device of claim 14, wherein reclaiming the cache page comprises:
determining right information of a mirrored cache page reference of the first cache page reference for accessing the cache page;
in response to determining the cache page being only accessible by the first cache page reference, reclaiming the cache page.

16. The device of claim 14, wherein reclaiming the cache page comprises:
in response to determining that the cache page is accessible by the first cache page reference and the second cache page reference, reclaiming the cache page based on the right information of the first cache page reference for accessing the cache page and the right information of a mirrored cache page reference of the first cache page reference for accessing the cache page.

17. The device of claim 11, wherein creating the second cache page reference corresponding to the cache page comprises:
in response that the operation is to store the data to a second position, creating at least one item of the second cache page reference:
an index of a storage device indicated by the second position,
a position on the storage device indicated by the second position,
right information of the second cache page reference for accessing the cache page, and
state information of the data.

18. The device of claim 11, wherein the actions further comprise:
in response to obtaining a flush indication on flushing the data, determining information of write protection of the cache page; and
flushing the data based on the information of write protection.

19. The device of claim 18, wherein flushing the data comprises:
in response to the information of write protection indicating that the cache page is in a non-write protection state, setting the cache page in a write protection state;
flushing the data; and
setting the cache page in a non-write protection state.

20. The device of claim 11, wherein the actions further comprise:
in response to a request to modifying data on the cache page a reply to the request generating based on a number of cache page references corresponding to the cache page and information indicating access right to the cache page comprised in the cache page, the reply indicating whether the data on the cache page is allowed to be modified.

21. A computer program product having a non-transitory computer readable medium which stores a set of instructions to perform storage management; the set of instructions, when carried out by computerized circuitry, causing the computerized circuitry to perform a method of:
in response to an operation to be performed on data in a cache page, determining a first cache page reference corresponding to the cache page, the first cache page reference comprising a pointer value indicating the cache page;
creating, based on the first cache page reference and the operation, a second cache page reference corresponding to the cache page, the second cache page reference comprising the pointer value; and
performing the operation on the data in the cache page via the second cache page reference.

22. The method of claim 1, further comprising providing access to the cache page in parallel via both the first cache page reference and the second cache page reference.

23. The method of claim 22, wherein the first cache page reference and the second cache page reference are both maintained in a single storage processor.

* * * * *